United States Patent
Aubrey

(10) Patent No.: US 7,001,039 B1
(45) Date of Patent: Feb. 21, 2006

(54) RETROFIT LIGHT FIXTURE MOUNTING DEVICE

(76) Inventor: Truman Aubrey, 1472 Beaudry Blvd., Glendale, CA (US) 91208

( * ) Notice: Subject to any disclaimer, the term of this patent is extended or adjusted under 35 U.S.C. 154(b) by 0 days.

(21) Appl. No.: 10/446,117

(22) Filed: May 28, 2003

(51) Int. Cl.
*F21S 8/00* (2006.01)

(52) U.S. Cl. ................... 362/147; 362/346; 362/408
(58) Field of Classification Search ............. 362/147, 362/260, 263, 364, 408, 302
See application file for complete search history.

(56) References Cited

U.S. PATENT DOCUMENTS 4,327,402 A * 4/1982 Aubrey .................. 362/288
5,716,125 A * 2/1998 Aubrey .................. 362/260

* cited by examiner

*Primary Examiner*—John Anthony Ward
(74) *Attorney, Agent, or Firm*—G. Donald Weber, Jr.

(57) ABSTRACT

A retrofit unit which is used for replacing conventional incandescent light bulbs with fluorescent light bulbs in existing lighting fixtures of the ceiling or wall mounted type.

26 Claims, 7 Drawing Sheets

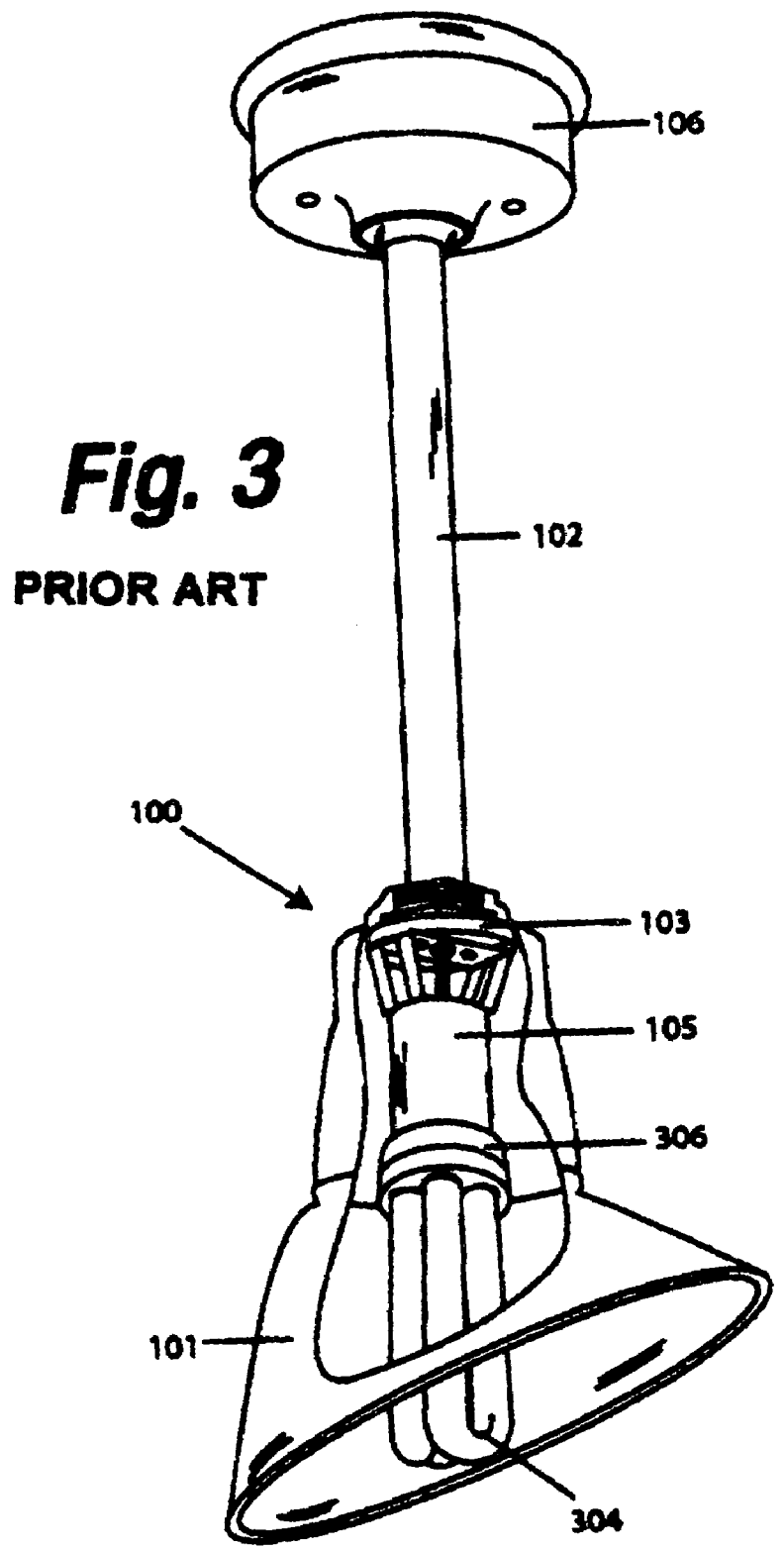

RETROFIT LIGHT FIXTURE MOUNTING DEVICE

BACKGROUND

1. Field of the Invention

This invention is directed to a retrofit unit for light fixtures, in general, and to a retrofit unit which permits fluorescent or similar light bulbs to replace incandescent light bulbs in an angled reflector, stem mounted, goose neck style fixtures, in particular.

2. Prior Art

There are many types of light fixtures which are known in the art. These include recessed fixtures, surface mounted fixtures, track-light fixtures and the like, including goose neck fixtures, specifically fixtures manufactured by Abolite or perhaps others. Most of the known light fixtures of this type use incandescent light sources therein. However, incandescent light sources have a short life and are inefficient. The number of lumens generated per electrical watt consumed is not economical and is generally on the order of 14 to 17 lumens per watt.

In addition, these types of light sources generally use a thin filament which glows when heated by electrical power, and tends to burn out or break rather easily.

Also, incandescent light sources tend to generate a large amount of heat which is given off into the surrounding area. This has the secondary shortcoming of producing heat in many places where excessive heat is not desired. Consequently, it becomes necessary to use air conditioning equipment or the like to eliminate this unwanted heat. Thus, incandescent light sources tend to be energy consumers and wasters.

Several types of alternative light sources are known in the art. For example, fluorescent, high-pressure sodium and metal halide lamps and the like are typical. These light sources generally tend to operate quite efficiently and provide 50 to 120 lumens per watt. The lower wattages do not, as a rule, produce excessive heat during operation.

However, these alternative light sources are normally not interchangeable with incandescent lamps or bulbs. For one thing, the different light sources may have different couplings, as is the case with fluorescent lamps. The "Edison-base" coupling which is common on the ordinary incandescent lamp and light fixture will not accept standard fluorescent fittings. Although single ended high-pressure sodium and metal halide lamps are available which can be screwed into an Edison-base socket, they cannot be successfully operated because, typically, arc discharge lamps require a ballast to operate the lamp. Furthermore, inasmuch as the ballast may be relatively large, it usually cannot be mounted within the interior of the fixture.

In order to convert an existing inefficient incandescent lighting system to a more efficient light source, it has been necessary in the past, to replace the existing lighting fixture with a totally new lighting fixture that incorporates the proper socket configuration and ballast assembly in a new fixture.

Consequently, it is highly desirable to develop light fixtures which permit these alternative light sources to be retrofitted into existing electrical system hardware efficiently and economically.

SUMMARY OF THE INSTANT INVENTION

This invention is directed to a retrofit kit which permits fluorescent or similar light bulbs to replace incandescent light bulbs in an angled reflector, wall-wash, stem mounted style fixture and position the relatively long fluorescent lamp at an angle of approximately 30° and allows the lamp to be mounted somewhat off center from the perpendicular existing incandescent socket at an angle to maximize maximum light levels and distribution onto merchandise displayed on walls while using the existing fixture reflector to shield the fluorescent from objectionable side light glare. The kit includes a pair of interacting base members with cooperating angles formed therein in order to provide an offset support for a light source socket to fit into the existing fixture. Alternatively, a socket-mounting bracket with rotational adjustment slots designed to adjust the fluorescent socket in each fixture can be used to accomplish maximum light level and aesthetic effect.

BRIEF DESCRIPTION OF THE DRAWINGS

FIG. 3 is a partially broken away view of the light fixture shown in FIG. 1 with a routine replacement of the incandescent light source with a fluorescent light source.

DESCRIPTION OF A PREFERRED EMBODIMENT

Figure 1:
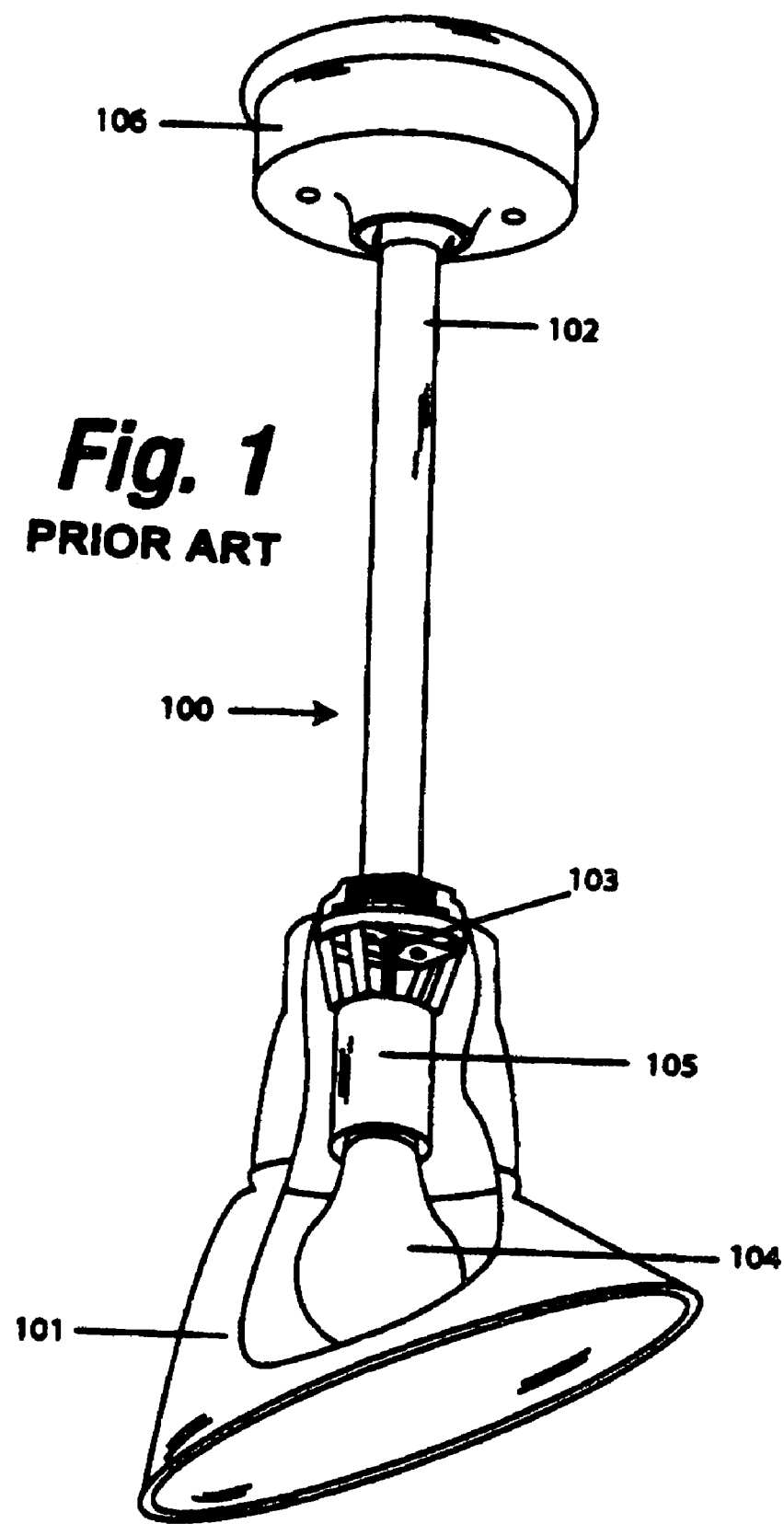
FIG. 1 is a partially broken away view of an existing light fixture with an incandescent light source mounted therein.

Referring now to FIG. 1, there is shown a partially broken away view of an existing incandescent light fixture 100 with an angled reflector 101 mounted on a stem 102. A conventional incandescent light source or bulb 104 is threadedly engaged with a conventional Edison-type socket 105. Electrical conductors 103 are threaded through the stem 102 and connected to a suitable power source in a junction box (not shown) within the structure or within a canopy 106 which can be ceiling or wall mounted.

It is seen that in this type of fixture, for example similar to an Abolite AD series fixture, the light source 104 is positioned to be completely received within the reflector 101 in an up and down 90° vertical position in order to be efficiently positioned relative to the "bulge" or curved portion of the reflector 101. This arrangement, typically, has been determined by the shape of the conventional light source 104.

Figure 2:
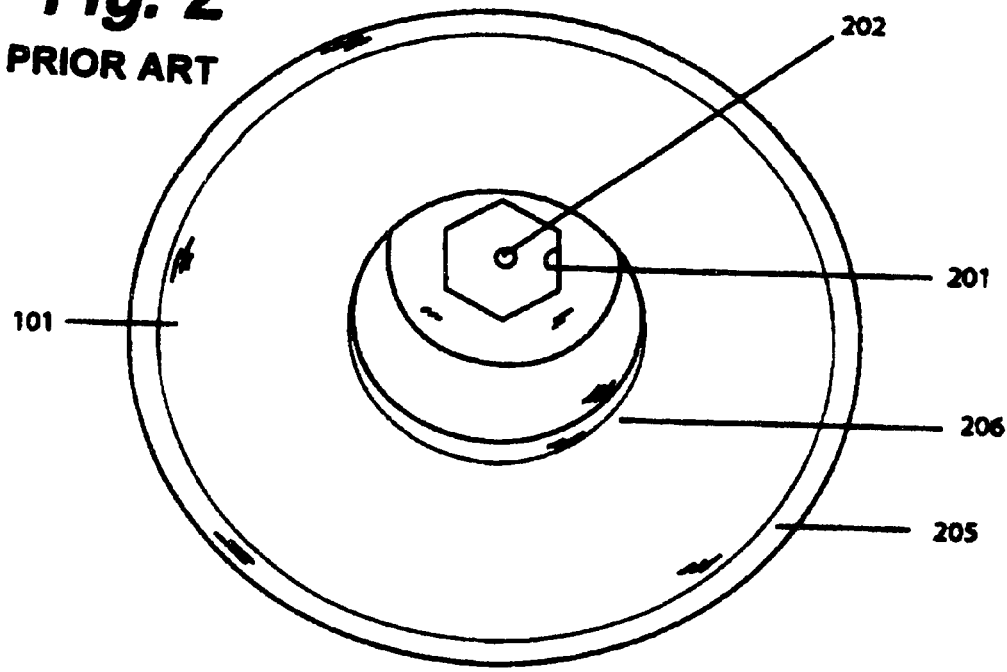
FIG. 2 is a view of the closed end of the light fixture shown in FIG. 1.

Referring now to FIG. 2, there is shown a representative end view of the reflector 101 of the light fixture 100 which also shows the front rim 205 and the bulge 206. It is seen that the closed end of the reflector includes an opening 201 which is defined as star-shaped or hex-shaped and which is effective to receive a similarly shaped (i.e., star or hex shaped) end of the Edison base and its mounting hardware (not shown). The opening 201 is effective to assist in securing a die cast mounting piece of the Edison-base socket in the reflector 101. Inasmuch as the conventional threaded Edison-base and the convention incandescent light bulb are threadedly engaged by rotational insertion, the position of the Edison-base vis-à-vis the star-shaped opening 201 is inconsequential. That is, the axis (represented by circle 202) of the Edison-base and the light bulb are always perpendicular to the end surface of the reflector 101.

Figure 2A:
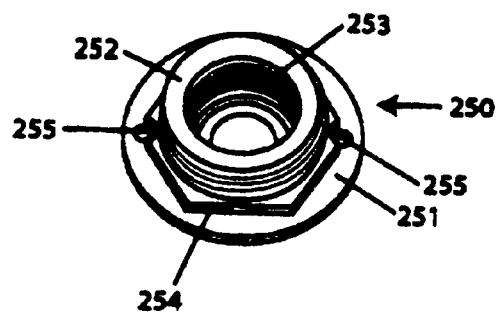
FIG. 2A is an oblique view of the die cast mounting bolt used in the existing light fixture.

Referring now to FIG. 2A, there is shown an oblique view of the die cast mounting bolt 250 which is provided with the existing light fixture 100 shown in FIG. 2. The nut includes a base 251 which is generally circular in configuration. A threaded shaft 252 extends upwardly from the base 251 and receives a securing nut not shown. The shaft includes an axial aperture 252 through which wires (not show) pass when the apparatus is assembled. In addition, the mounting bolt includes the hexagonal (or similar) section 254 adjacent to (or formed wit) base 251. The section 254 passes through and interlocks with the aperture 201 of the reflector 101 shown in FIG. 2. A plurality of holes 255 pass through the base 251 for attachment of an Edison-base thereto. It is clear that the section 254, in conjunction with the aperture 201 establishes a fixed orientation of the Edison-base when installed in the reflector. As noted, this orientation is not of concern when a screw-type incandescent bulb is used with the fixture.

Referring now to FIG. 3, there is shown an example of a current practice to merely replace an incandescent light source 104 with fluorescent light source 304 in a fixture 100 (as shown in FIG. 1). The fluorescent tube 304 and socket 306 are direction specific. That is, the fluorescent base socket must be properly aligned to correctly receive and position the base of the fluorescent tube in order to obtain maximum light output which is achieved by specific fluorescent tube alignment relative to the reflector. Because, the star-shaped hex opening 202 (see FIG. 2) and a star-shaped hex base (or base support) are also position specific, a potential misalignment could be encountered if an incandescent base is merely replaced by a fluorescent base or converter.

Furthermore, when an elongated fluorescent light source 304 is used, the length of the light source frequently creates objectionable side glare not shielded by the reflector 101. Consequently, a proper mounting structure for the fluorescent base is required in a retrofit operation.

Figure 4:
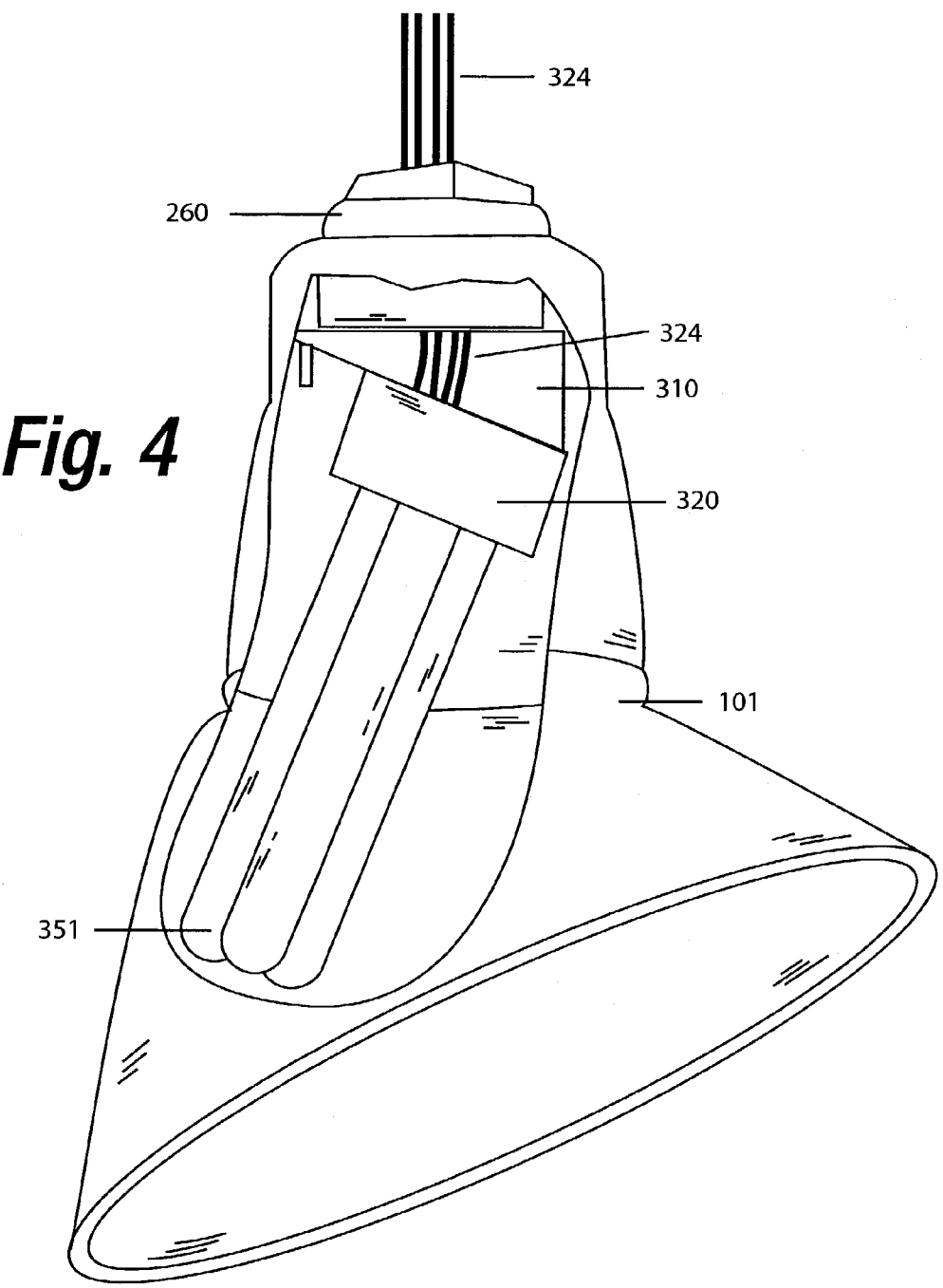
FIG. 4 is a partially broken away side view of the existing light fixture with a fluorescent light source mounted therein using the retrofit kit of the instant invention.

Referring now to FIG. 4, there is shown a partially broken away view of the existing light fixture reflector 101 with a properly positioned fluorescent light bulb 351 mounted therein. To achieve this position properly (and without a great deal of hassle because of the star-shaped hex opening 201 shown in FIG. 2) a retrofit angle mounting base 310 is shown schematically. An appropriate fluorescent tube base 303 is mounted on the base 310. Conductors 324 pass through the base and the reflector 101 for external connection of the fixture as before.

Figure 5:
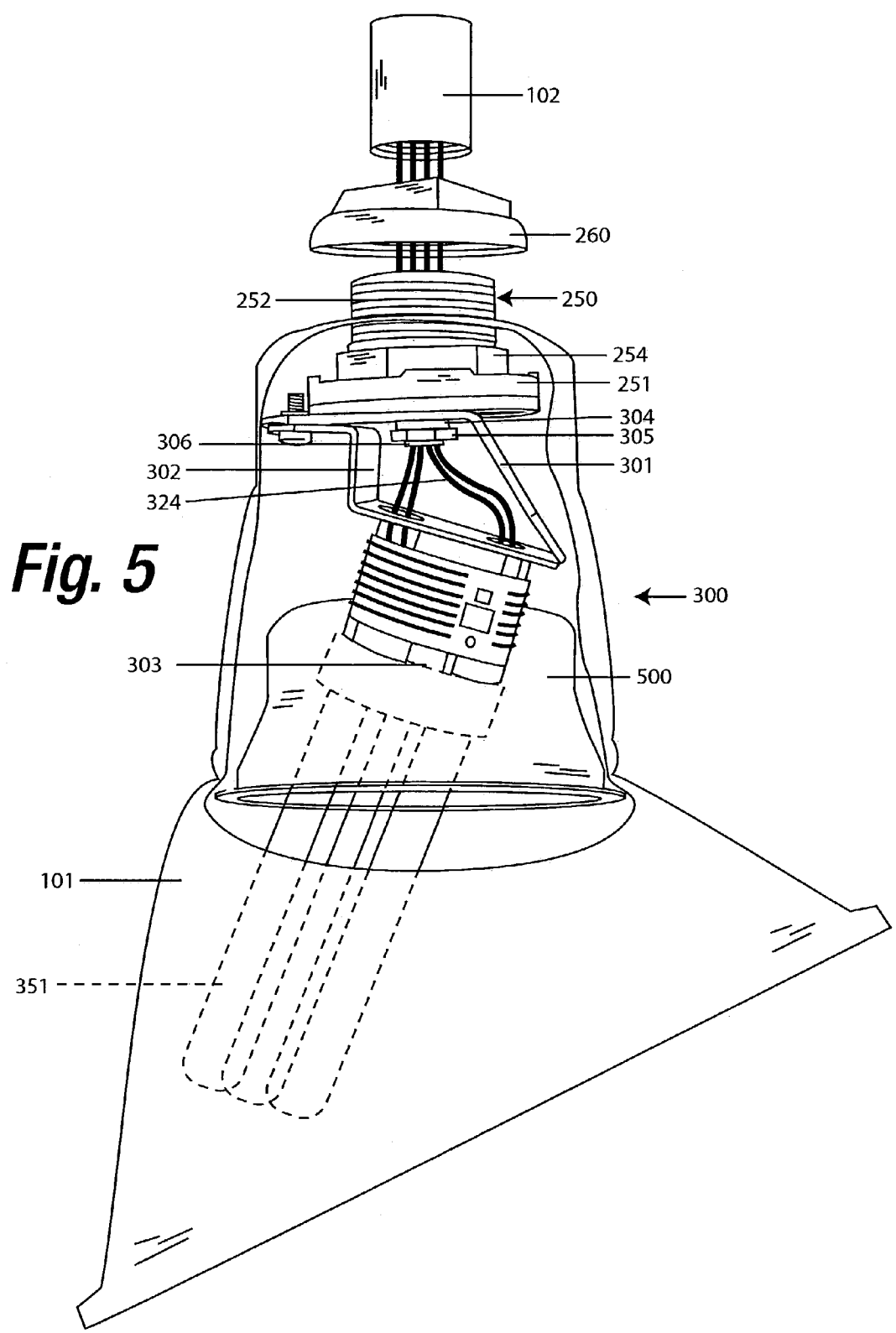
FIG. 5 is a side view of the retrofit angle mount of the retrofit kit of the instant invention.

Referring now to FIG. 5 there is shown a detailed side view of an assembled retrofit mounting base kit 300 which is used to retrofit the angled lamp reflector 101 for fluorescent light sources. The kit 300 includes a mounting base 301 which fits within the neck of the angled reflector and a support base 302 which is adapted to selectively engage the mounting base 301.

The support base 302 has a conventional four prong fluorescent base 303 affixed thereto in the proper position to assure that the fluorescent light source 351 (shown in dashed outline) extends into and is positioned properly in the reflector 101.

The fluorescent base 303 is connected to multiple conductors 324 which pass through appropriate openings through the support base 302. The conductors (i.e. wires) pass through openings in base 302 and are enclosed in a suitable sleeve and passed through an opening in the mounting base 301. The sleeved conductors pass through a threaded nipple 306, appropriate spacers or washers 304 and a securing nut 305. The nipple (see FIG. 6) extends through the cast mounting bolt 250 which engages star-shaped hex opening 201 in the reflector. The mounting bolt 250 is engaged by nut 260 as is conventional. The conductors then pass through the existing mounting stem 102 (if appropriate) where the conductors are available for connection to the junction box, ballast and other external circuitry which is not a portion of this invention, per se.

Also, shown in FIG. 5 is an optional auxiliary filter 500. The filter 500 is inserted into the throat of reflector 101 and held in place by any suitable means (see FIG. 7 infra). The auxiliary filter 500, effectively, surrounds the base of fluorescent tube 351 and provides additional reflector capability for the revised fixture.

Figure 6:
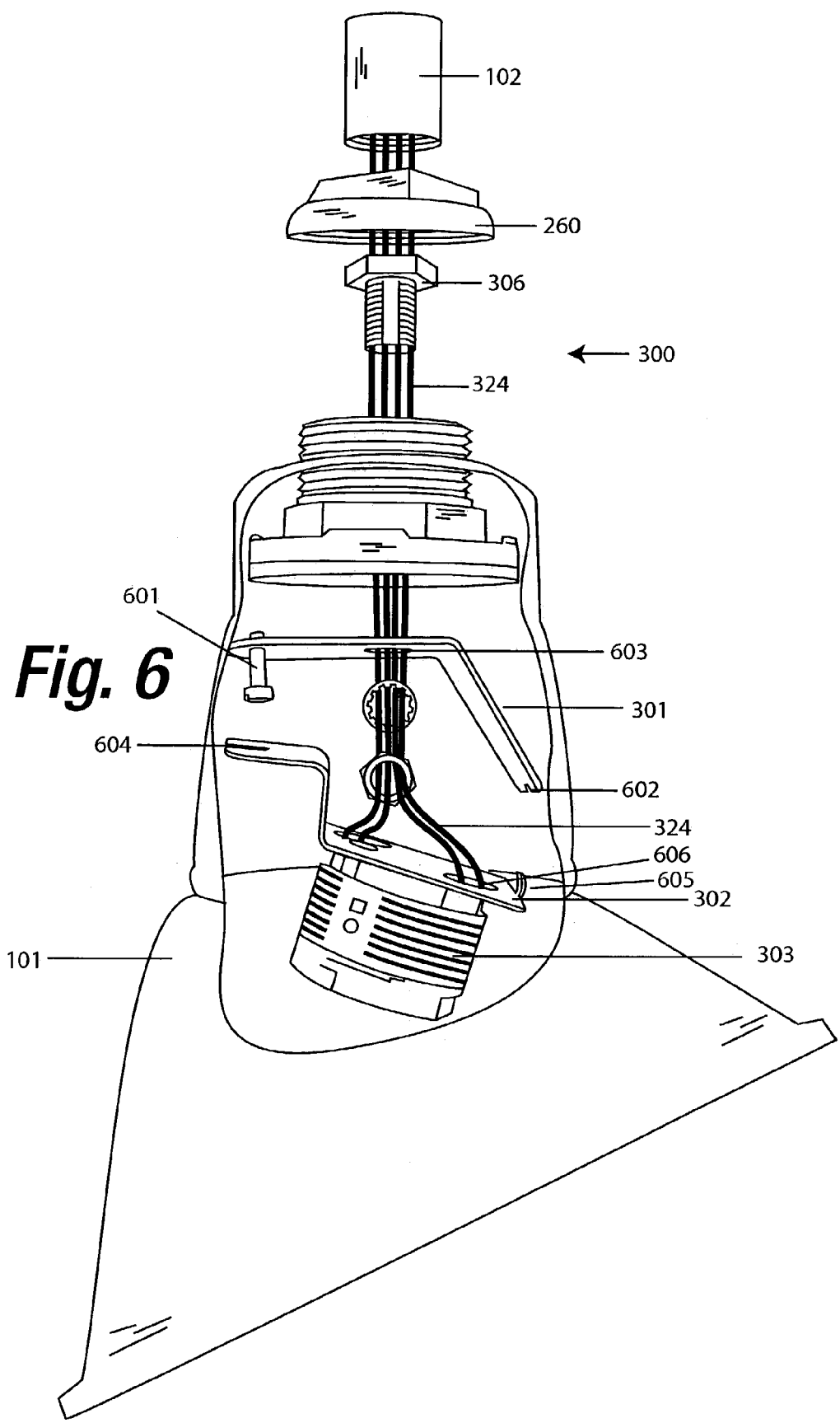
FIG. 6 is an exploded view of the retrofit angle mount of the retrofit kit of the instant invention.

Referring now to FIG. 6 there is shown an exploded view of the retrofit mounting kit 300 which shows additional details thereof and the relations to the reflector 101.

The mounting base 302 is, typically, formed of sheet metal, plastic or other suitable material which has sufficient strength to support the fluorescent light 351 and base 303. The upper end of the mounting base 301 is curved or arcuate so as to fit snugly into the neck of the angled reflector 101. A fastener securing device in the form of a screw 601 is provided adjacent the upper end of the mounting base. The lower end of the mounting base 301 includes a locking niche 602 and is shaped to readily fit into the reflector 101. The mounting base is bent at an interior obtuse angle, typically, but limitatively of about 135°. In addition, an aperture 603 passes through the upper portion of the mounting base 301 and is adapted to receive the nipple 306 through which the sleeved conductors 324 pass. Appropriate mounting hardware is provided to secure the mounting base to the reflector as described supra.

The support base 302 is also fabricated of sheet metal, plastic or the like which is of suitable strength to support the fluorescent base 303 and light source 351. The upper end of the support base 302 is curved in substantially the same configuration as the upper end of the mounting base 301. An aperture or slot 604 is formed in the upper end of the support base 321 to engage the fastener 601 which is mounted adjacent the upper end of the mounting base 301. The lower end of the support base includes a tab 605 which is adapted to engage the niche or slot 602 in the lower end of the mounting base.

The support base 302 includes two bends of approximately 90° each to produce a somewhat Z-shaped configuration with two prominent surfaces. The fluorescent tube base 303 is secured to the lower and, typically, larger surface for example by rivets or the like. One or more apertures 606 are formed through this surface portion to permit passage of the conductors 324 from the base 303 therethrough.

The wiring portion (i.e. conductors 324) of the kit is connected to the base 303 and passes through the support base 302, the nut 305, the spacer/washer 304, the mounting base 301, the mounting bolt 250 and the nipple 306 for connection to the existing circuitry via a ballast, as required.

In utilization, the existing Edison-type socket assembly including socket 105 and wires are removed from the reflector. The mounting base 301, including the nipple 306, is installed in the existing socket plate with the hex star-shaped surface. The mounting hardware is tightened to secure the mounting base to the existing socket plate. The support base 302 is then installed in engagement with the mounting plate and the sleeved conductors 324 passed through the nipple.

The tab 605 is engaged with the niche 602 while the slot 604 in the upper end of the support base 302 is engaged with the fastener 601 adjacent the upper end of the mounting base 301. The mounting base and the support base are securely joined together.

The new socket assembly with the retrofit kit is then inserted into the reflector and secured in place by the external hold down nut.

Figure 7:
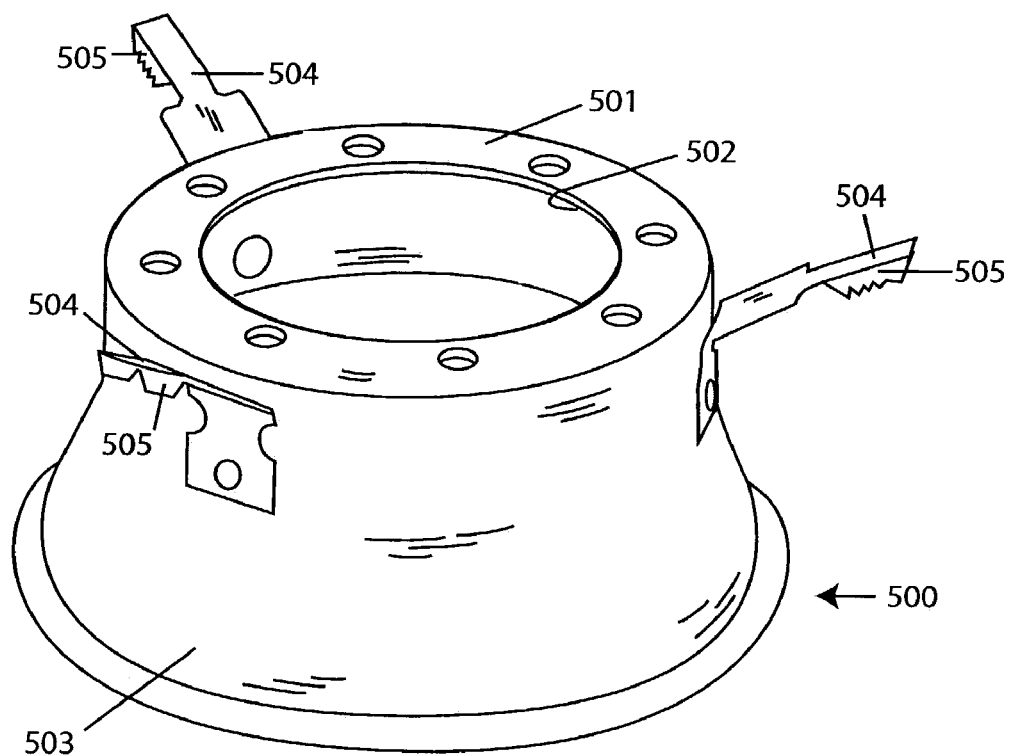
FIG. 7 is an oblique view of an optional auxiliary socket reflector.

Referring now to FIG. 7, there is shown an optional auxiliary socket reflector 500 which can be slidably inserted into the niche of the reflector 101, if desired.

The auxiliary reflector 500 is, typically, fabricated of aluminum or other light reflecting material. The auxiliary reflector has a generally cylindrical inner end 501 with an aperture 502 therethrough to accept the existing light fixture base therethrough (see FIG. 5 supra). The auxiliary reflector includes a flared outer end 503 which corresponds to the inner dimension of reflector 101.

A plurality of resilient tabs 504 are affixed to the auxiliary filter, typically near the inner end 501 thereof. The tabs may be made of a strong, flexible material which include retention teeth 505 and operate as spring-loaded tabs to engage the inner surface of the reflector 101. Thus, the auxiliary reflector is retained within reflector 101 and provides an enhances lighting fixture by reflecting a greater portion of the light produced by the fluorescent tube.

Thus, there is shown and described a unique design and concept of a retrofit light fixture mounting device. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A retrofit kit to provide an offset support for a light source socket for converting light fixtures from incandescent bulbs to fluorescent bulbs comprising,
a mounting base adapted to be inserted into the light fixture,
said mounting base defines an internal obtuse angle between contiguous surfaces thereof, and
a support base adapted to selectively engage said mounting base within the light fixture,
said support base defines a Z-shape with two substantially right angles between three contiguous surfaces thereof,
said mounting base has a slot formed at a first edge thereof,
said support base has a tab extending from a first edge thereof such that said tab is aligned to interact with said slot in said mounting base,
said mounting base has an aperture at a second edge thereof, and
said support base has an aperture at a second edge thereof which is aligned with the aperture in said mounting base whereby an engagement device can be utilized to secure said support base to said mounting base.

2. The kit recited in claim 1 wherein,
said mounting base includes a second aperture in one of said contiguous surfaces for passing electrical connectors therethrough.

3. The kit recited in claim 2 including,
a nipple selectively inserted through said aperture for passing the electrical connectors therethrough.

4. The kit recited in claim 1 including,
an electrical socket mounted on one of said contiguous surfaces of said support base.

5. The kit recited in claim 4 wherein,
said electrical socket is adapted to receive fluorescent light bulbs therein.

6. The kit recited in claim 4 wherein,
said electrical socket is fixedly attached to said support base.

7. The kit recited in claim 4 wherein,
said support base includes at least one aperture therethrough for passing electrical conductors therethrough to said electrical socket.

8. The kit recited in claim 4 including,
multiple electrical conductors attached to said electrical socket.

9. The kit recited in claim 8 wherein,
said multiple conductors comprise at least four individual conductors, and
sleeve means encasing all of said multiple conductors.

10. The kit recited in claim 9 wherein,
the four individual conductors comprise two power conductors and two ground conductors.

11. The kit recited in claim 8 including,
a jacket means for selectively engaging the ends of said multiple conductors into a single free end.

12. The kit recited in claim 1 including,
an auxiliary reflector adapted to be mounted in the light fixture adjacent to said mounting base and said support base.

13. A retrofit kit for converting light fixtures from incandescent bulbs to fluorescent bulbs wherein said retrofit kit includes a socket mounting bracket comprising,
a mounting base adapted to be inserted into the light fixture,
said mounting base defines an internal obtuse angle between contiguous surfaces thereof, and
a support base adapted to selectively engage said mounting base within the light fixture,
said support base defines a Z-shape with two substantially right angles between three contiguous surfaces thereof such that at least one surface of said support base is adapted to support an electrical socket thereon in an offset configuration relative to the light fixture.

14. The kit recited in claim 13 wherein,
said mounting base has a slot formed at one edge thereof, and
said support base has a tab extending from one edge thereof wherein said tab is aligned to interact with said slot.

15. The kit recited in claim 13 wherein,
said mounting base has an aperture at an edge thereof, and
said support base has an aperture at an edge thereof which is aligned with said aperture in said mounting base whereby an engagement device can be utilized to secure said support base to said mounting base.

16. The kit recited in claim 13 wherein,
said mounting base includes an aperture for passing electrical connectors therethrough.

17. The kit recited in claim 16 including, a nipple selectively inserted through said aperture, and arranged for passing the electrical connectors therethrough.

18. The kit recited in claim 13 including, an electrical socket mounted on said one surface of said support base.

19. The kit recited in claim 18 wherein, said electrical socket is adapted to receive fluorescent light bulbs therein.

20. The kit recited in claim 18 wherein, said electrical socket is fixedly attached to said support base.

21. The kit recited in claim 18 wherein, said support base includes at least one aperture therethrough for passing electrical conductors therethrough to said electrical socket.

22. The kit recited in claim 18 including, multiple electrical conductors attached to said electrical socket.

23. The kit recited in claim 22 wherein, said multiple conductors comprise at least four individual conductors, and sleeve means encasing all of said multiple conductors.

24. The kit recited in claim 23 wherein, the four individual conductors comprise two power conductors and two ground conductors.

25. The kit recited in claim 22 including, a jacket means for selectively engaging the ends of said multiple conductors into a single free end.

26. The kit recited in claim 13 including, an auxiliary reflector adapted to be mounted in the light fixture adjacent to said mounting base and said support base.

* * * * *